UNITED STATES PATENT OFFICE.

MAXIMILIAN MAYER AND JOSEPH N. WIGGIN, OF ORANGE, AND ROBERT W. CORNELISON, OF BLOOMFIELD, NEW JERSEY, ASSIGNORS TO H. B. WIGGIN'S SONS COMPANY, A CORPORATION OF NEW JERSEY.

COMPOSITION OF MATTER TO BE USED AS COATING, SIZE, OR PASTE.

1,049,251.  Specification of Letters Patent.  Patented Dec. 31, 1912.

No Drawing.  Application filed March 10, 1906.  Serial No. 305,298.

*To all whom it may concern:*

Be it known that we, MAXIMILIAN MAYER and JOSEPH N. WIGGIN, residing at Orange, Essex county, in the State of New Jersey, and ROBERT W. CORNELISON, residing at Bloomfield, Essex county, New Jersey, all being citizens of the United States, have invented certain new and useful Improvements in Composition of Matter Adapted to be Used as Coating, Size, or Paste, of which the following is a specification.

Our invention relates to a composition adapted to be used for coating or sizing or pasting on surfaces covered by paint, enamel or varnish, glazed surfaces, glass, and other similar surfaces to which the common pastes of the various kinds now known will not adhere satisfactorily, and it is adapted to be used either by coating such surfaces directly, or by combining it with the paste and using the combination for the purpose of attaching other articles, *e. g.* heavy wall paper, burlaps, &c., to a varnished wall.

When an insoluble or sparingly soluble granular or gritty material is mixed with an animal or vegetable binding and thickening material, and then proper ingredients added to give strength, body, and covering power, which are desirable when any material is spread with a brush, this coating can be readily applied to painted or varnished surfaces, and after the coating is dry, we can cause to permanently adhere thereto, wall paper or woven fabrics, by the use of ordinary paste. This is of much value, particularly in interior decoration of houses, as frequently it is necessary to paper, or to hang a burlap or other woven fabric, on a painted or varnished wall. Heretofore there have been no satisfactory means of doing this with ordinary flour or starch paste, such as paperhangers use; it being necessary, in most cases, to remove the paint or varnish before applying the paper or fabric.

We have studied out very carefully, with many experiments, the most advantageous material, and proportions of the same, to produce a composition which, on the one hand, will adhere to the painted, varnished, glazed or glassy surface, and on the other hand will cause the paste to adhere to it. We have discovered that two primary factors will produce such a composition: First, an insoluble gritty or granular inorganic material, which we shall call the granular substance. Second, an organic binding and thickening material, which we shall call the thickening binder.

As pointed out above, other qualities are desirable; and although a simple mixture of a granular material with a binding and thickening substance might answer some purposes, we have been able to obtain much better results for some uses by the addition of an adhesive ingredient such as glue,—a body giving, or covering ingredient such as china clay or Paris white,—and a softening ingredient such as glycerin.

As a gritty or granular substance, we may use fine sand, pumice stone, plaster of Paris, or other crystalline, gritty or granular material, insoluble, or nearly so in water. For a softener, glycerin, or a syrup or molasses, but the glycerin is very satisfactory. For an adhesive material, glue, gelatin or casein, may be used, although the flour used for a thickening binder also serves the purpose, to a greater or less extent. As a thickening binder we may use wheat or rye flour, starch, tapioca, or other similar farinaceous material, or a gum, *e. g.* tragacanth.

In order to prevent the mixture from fermenting after it is prepared for use, we may add from one to five-tenths of one per cent. of an antiseptic substance, for instance, beta naphthol. For some commercial purposes it is desirable to perfume the composition, and when this is the case, sassafras, bitter almond or other perfuming oil may be used.

A composition which, made according to our invention, produces very satisfactory results is made as follows: Take 150 pounds of plaster of Paris, 60 pounds Paris white, 2½ pounds of glycerin, 21 pounds of finely comminuted glue, 55 pounds of wheat flour, and ½ pound of beta naphthol and mix the same thoroughly; of this mixture the user takes 2 pounds and stirs into 3 pints of water, then heat the mass until it has reached a temperature sufficient to bring about a solution of the soluble material and expansion of the starchy material. The mixture should be stirred before and while cooking. It is advisable to strain it before using.

The organic thickening binding ingredients employed should be in proportion not less than one-fifth, and preferably about one-fourth, in weight, to three-fourths in weight of the inorganic substantially insoluble ingredients.

This composition so prepared may then be applied directly to a glass or metal surface, to walls or woodwork covered with enamel, paint, varnish, or to almost any surface to which ordinary paste will not adhere properly. It may be spread upon such surfaces with a brush as paint is spread upon them, and then allowed to dry. After the coated surface is dry, it will be found that paste will readily adhere to it, and that ordinary flour paste may be used for hanging wall paper or other similar covering materials thereon, and these will then adhere perfectly to such a coated surface.

It will also be found that a composition prepared according to the formula described can be readily, conveniently and easily spread upon glazed or other surfaces to which ordinary paste will not adhere, and will there make a perfect binding surface for paste, and will also receive and retain a fresh coat of paint, varnish, etc.

We do not limit ourselves to the exact proportions above given of the different ingredients, as these may be varied without departing from our invention.

It is evident that whichsoever of the above mentioned ingredients may be employed for a gritty substance, for binder, for thickener, for softener, or for the material which will give body or covering power, the principle of our composition is the same. We may at one time use wheat flour only for the binder and thickener; at another time, we may prefer to use rye flour. At one time we may use china clay to give covering power; at another time, we may prefer to use Paris white, barium sulfate, oxid of zinc, basic carbonate of lead, or other similar substance.

It is evident also that under certain conditions, it may be permissible to omit some of the secondary ingredients, by which term we refer to the adhesive or covering ingredients. This composition is peculiarly adapted for commercial purposes, as where the composition may be kept for a considerable period before being used, and also for use in very dry climates and situations. We would also emphasize the fact that the thickening binders which have been mentioned above, namely, flour, starch, etc., may serve the rôles of a binding material and thickening agent, and adhesive agent. It will, therefore, be evident that we could make quite an efficient coating size by using for the primary ingredients, that is, the binder and granular materials, many farinaceous, and many insoluble granular substances.

If the surface to be treated is intended to be prepared for hanging wall paper or other similar covering material, then instead of coating such surface first with the composition and allowing it to dry thereon, and then pasting thereon the wall paper, etc., the same result may be obtained by adding the composition directly to the paste intended to be used. When thus used, the proportion which we have found useful is to take 2 pounds of the dry composition, 3 pounds of water, mix, cook, stir while mixing and cooking, and add to 5 pounds of ordinary paste such as paperhangers use.

Our composition may also be used very advantageously in preparing calcimine. When used for this purpose the preparation which will produce a satisfactory result is the following: Take one pound of the dry mixture, add one pound of Paris white, and two pounds of water, and stir thoroughly; heat the mass to a temperature sufficient to burst the starch granules contained in the farinaceous ingredient, this temperature varies for different starches but is in the neighborhood of from 60 to 80 degrees centigrade. Then add sufficient pigment or coloring material to give the desired hue or shade.

Having thus fully described our invention, what we claim as new, and desire to secure by Letters Patent is:

1. A composition of matter in the form of a dry powder, consisting of about 150 pounds of granular plaster of Paris, 60 pounds of Paris white, 21 pounds of finely comminuted glue, 55 pounds of flour, and two and one-half pounds of glycerin, substantially as described.

2. A composition of matter in the form of a dry powder, consisting of about 150 pounds of granular plaster of Paris, 60 pounds of Paris white, 21 pounds of finely comminuted glue, 55 pounds of flour, two and one-half pounds of glycerin, and 8 ounces of beta naphthol, substantially as described.

3. A composition of matter in the form of a dry powder, consisting of about 150 pounds of granular plaster of Paris, 60 pounds of Paris white, 21 pounds of finely comminuted glue, 55 pounds of flour, 8 ounces of beta naphthol, two and one-half pounds of glycerin, and a suitable quantity of sassafras or other perfuming oil, substantially as described.

4. A composition of matter in a dry state comprising approximately three parts of a granular and gritty inorganic substance, approximately one part of an organic thickening and binding ingredient and a softening agent, capable upon the addition of water of forming a thin coating firmly adherent to smooth impervious surfaces and coatings of smooth adhesives.

5. A granular and gritty composition of matter in the form of a dry mixture comprising a granular inorganic constituent, a thickening binder and a softening agent.

6. A granular and gritty composition of matter in the form of a dry mixture, comprising a granular inorganic constituent, a thickening binder capable, upon the addition of water, of forming a thin coating firmly adherent to smooth, impervious surfaces, and smooth coatings of adhesives and a softening agent.

7. A composition of matter in the form of a dry powder, consisting of about 150 pounds of granular plaster of Paris, 60 pounds of Paris white, a quantity of glycerin, 21 pounds of finely comminuted glue, and 55 pounds of flour, substantially as described.

8. A composition of matter in the form of a dry powder, consisting of about 150 pounds of granular plaster of Paris, 60 pounds of Paris white, a quantity of glycerin, 21 pounds of finely comminuted glue, 55 pounds of flour, and 8 ounces of beta naphthol, substantially as described.

9. A composition of matter in the form of a dry powder, consisting of about 150 pounds of granular plaster of Paris, 60 pounds of Paris white, a quantity of glycerin, 21 pounds of finely comminuted glue, 55 pounds of flour, 8 ounces of beta naphthol, and a suitable quantity of sassafras or other perfuming oil, substantially as described.

MAXIMILIAN MAYER.
JOSEPH N. WIGGIN.
ROBERT W. CORNELISON.

Witnesses:
JAMES E. PHILLIPS,
CONRAD FEUSER.